United States Patent
Fukumoto et al.

(10) Patent No.: US 9,422,419 B2
(45) Date of Patent: Aug. 23, 2016

(54) SURFACE-TREATED CALCIUM CARBONATE FILLER, AND CURABLE RESIN COMPOSITION CONTAINING THE FILLER

(71) Applicant: MARUO CALCIUM CO., LTD., Akashi-shi (JP)

(72) Inventors: Katsunori Fukumoto, Akashi (JP); Yusuke Hayashi, Akashi (JP); Shigeru Sakaguchi, Akashi (JP); Tatsunari Yago, Akashi (JP)

(73) Assignee: MARUO CALCIUM CO., LTD., Akashi-shi (JP)

( * ) Notice: Subject to any disclaimer, the term of this patent is extended or adjusted under 35 U.S.C. 154(b) by 0 days.

(21) Appl. No.: 14/396,987

(22) PCT Filed: Apr. 26, 2013

(86) PCT No.: PCT/JP2013/062341
§ 371 (c)(1),
(2) Date: Oct. 24, 2014

(87) PCT Pub. No.: WO2013/168600
PCT Pub. Date: Nov. 14, 2013

(65) Prior Publication Data
US 2015/0112009 A1    Apr. 23, 2015

(30) Foreign Application Priority Data

May 8, 2012   (JP) .................................. 2012-106515

(51) Int. Cl.
| | | |
|---|---|---|
| *C09C 1/02* | (2006.01) | |
| *B32B 27/28* | (2006.01) | |
| *C08K 9/04* | (2006.01) | |
| *C09C 3/08* | (2006.01) | |
| *C09J 123/22* | (2006.01) | |
| *C09J 183/04* | (2006.01) | |
| *C08L 101/00* | (2006.01) | |
| *C08L 83/04* | (2006.01) | |
| *C09K 3/10* | (2006.01) | |
| *C08K 3/26* | (2006.01) | |
| *C09J 133/06* | (2006.01) | |

(52) U.S. Cl.
CPC . *C08K 9/04* (2013.01); *C08L 83/04* (2013.01); *C08L 101/00* (2013.01); *C09C 1/02* (2013.01); *C09C 1/021* (2013.01); *C09C 3/08* (2013.01); *C09J 123/22* (2013.01); *C09J 183/04* (2013.01); *C09K 3/1006* (2013.01); *C09K 3/1018* (2013.01); *C01P 2002/50* (2013.01); *C01P 2006/10* (2013.01); *C01P 2006/12* (2013.01); *C01P 2006/14* (2013.01); *C01P 2006/22* (2013.01); *C08K 2003/265* (2013.01); *C09J 133/06* (2013.01); *C09K 2200/0239* (2013.01); *C09K 2200/0617* (2013.01); *C09K 2200/0625* (2013.01)

(58) Field of Classification Search
None
See application file for complete search history.

(56) References Cited

FOREIGN PATENT DOCUMENTS

| | | |
|---|---|---|
| JP | 11-349846 A | 12/1999 |
| JP | 2004-123934 A | 4/2004 |
| JP | 2004-331963 A | 11/2004 |
| JP | 2004-345932 A | 12/2004 |
| JP | 2004-345932 A1 | 12/2004 |
| JP | 2007-169485 A | 7/2007 |
| JP | 2007-169485 A1 | 7/2007 |
| JP | 2008-222493 A | 9/2008 |
| JP | 2008-222493 A1 | 9/2008 |
| JP | 2009-270124 A | 11/2009 |
| JP | 2011-094134 A | 5/2011 |
| JP | 2011-94134 A1 | 5/2011 |

OTHER PUBLICATIONS

Machine Translation of Hayashi et al. JP 2007-169485 p. 1-49.*
Full translation of Hayashi et al. JP 2007-169485 p. 1-55.*
International Search Report for International Application No. PCT/JP2013/062341 dated Jun. 4, 2013.

* cited by examiner

*Primary Examiner* — Susannah Chung
*Assistant Examiner* — Robert T Butcher
(74) *Attorney, Agent, or Firm* — Kratz, Quintos & Hanson, LLP

(57) ABSTRACT

The surface-treated calcium carbonate filler having a floc structure is provided which can provide a curable resin composition which has a high thixotropic property, exerts a high elongation degree at a low modulus, and has such a restoring rate that a load to be applied onto an adherend is reduced particularly by mixing in the curable resin composition, and the curable resin composition containing the filler.

The surface-treated calcium carbonate filler is comprised of a synthetic calcium carbonate which is surface-treated with a fatty acid-based organic material containing a fatty acid salt and has a floc structure, wherein a ratio Sr of the amount of a fatty acid salt for which a counter ion is of monovalent, and which is contained in surface-treating agents eluted as free materials when the surface-treated calcium carbonate is refluxed with ethanol, to the total amount of the surface-treating agents is 10 to 30 wt %, and a porosity Po at the time of the consolidation of the surface-treated calcium carbonate is 38 to 45 wt %.

8 Claims, No Drawings

SURFACE-TREATED CALCIUM CARBONATE FILLER, AND CURABLE RESIN COMPOSITION CONTAINING THE FILLER

TECHNICAL FIELD

The present invention relates to a surface-treated calcium carbonate filler, and a curable resin composition which contains the filler, and more particularly to a surface-treated calcium carbonate filler capable of providing a curable resin composition which has a thixotropic property, exerts a high elongation degree at a low modulus, and has such a restoring rate that a load to be applied onto an adherend is reduced particularly when mixing the filler in the curable resin composition; and a curable resin composition which contains the filler.

BACKGROUND ART

A silicone-based resin composition or a polyisobutylene-based resin composition, which has a silanol group or a reactive silyl group at a terminal and forms a siloxane bond by hydrolysis and a condensation reaction, is widely used in a variety of fields since a cured material thereof is excellent in properties such as weatherability, durability, heat resistance and cold resistance, and particularly, a modified silicone-based resin composition is used in high volume as sealing agents, adhesives, floor materials, waterproof materials and coating materials in the field of architecture. Particularly, in recent years, a siding board is used in place of use of a wall clay, and therefore demands for modified silicone-based sealing material increase rapidly. When the siding board is used, since the board is large, there is a problem that a gap is generated between the board and the sealing material to cause joint cuts due to contraction of the board. The siding board is often attached to a vertical portion, and naturally, it is necessary that the sealing material does not hang down between application of the sealing material and curing of the sealing material and has a high thixotropic property to avoid the influence on workability during application.

In order to impart thixotropic characteristics, colloidal silica has been used, however, it includes many problems that it produces cracks or it has a very high modulus after curing to cause deterioration of the following character to an adherend. Further, in order to retain adhesion between the sealing material and the siding board, a sealing material having a low modulus, in which a restoring force is weakened by adjusting a catalyst, is used. In this case, there is a problem that the following character to elongation and contraction of the siding board is increased after the execution of work, restoring force, a restoring force and strength of the sealing material are reduced.

Further, in order to impart a thixotropic property or a following character for a joint, a chain-like surface-treated calcium carbonate is also proposed (Patent Document 1). Moreover, it is reported that as this type of surface-treated calcium carbonate filler, a surface-treated calcium carbonate, which is formed by surface-treating calcium carbonate with metal soap of a saturated fatty acid, metal soap of an unsaturated fatty acid or metal soap of an aliphatic carboxylic acid by a wet process, and reducing extremely the alkali metal content, imparts an excellent thixotropic property, slump resistance and good storage stability to the curable resin composition (refer to Patent Documents 2 and 3). Moreover, it is reported that a surface-treated calcium carbonate, which is surface-treated with a surface-treating agent made from non-metallic soap, has an excellent thixotropic property and slump resistance in the curable resin composition, and imparts excellent storage stability and adhesion properties not seen before (refer to Patent Document 4).

Further, a surface-treated calcium carbonate filler, in which the amount of the fatty acid salt having a counter ion of monovalent is markedly increased, is also provided (refer to Patent Document 5).

PRIOR ART DOCUMENTS

Patent Documents

Patent Document 1: JP 2009-270124 A
Patent Document 2: JP 11-349846 A
Patent Document 3: JP 2004-123934 A
Patent Document 4: JP 2004-331963 A
Patent Document 5: JP 2007-169485 A

SUMMARY OF THE INVENTION

Problems to be Solved by the Invention

However, these conventional fillers are found that the fillers have advantages and disadvantages, for example, when mixed in the curable resin and are thus not necessarily satisfactory. That is, the surface-treated calcium carbonate described in Patent Document 1 is easily oriented because of having a chain-like form, and therefore it is strong in a longitudinal direction of the chain but is very weak for stress in a direction perpendicular to the longitudinal direction to easily produce cracks. Further, the surface-treated calcium carbonates described in Patent Documents 2 to 4 have a high modulus and a low elongation degree and therefore have a possibility that they may create problems in a following character for a joint because all of these calcium carbonates have high strength but do not contain a fatty acid salt for which a counter ion is of monovalent. Moreover, the surface-treated calcium carbonate filler described in Patent Document 5 has a problem of low water resistance because a surface-treating agent tends to be hydrophilic though the filler exhibits a high elongation degree at a low modulus.

In view of such a situation, it is a main object of the present invention to provide a surface-treated calcium carbonate filler having a floc structure, which can improve the following character to the movement (elongation and contraction) of a joint and suppress reductions in a restoring rate and strength by realizing excellent workability and a high elongation degree at a low modulus through providing a high thixotropic property particularly when mixing the filler in a curable resin composition, and a curable resin composition which contains the filler.

Solutions to the Problems

The present inventors made earnest investigations for the purpose of solving the above-mentioned problems, and consequently found that a surface-treated calcium carbonate having a floc structure, in which the ratio Sr of the amount of a fatty acid salt having a counter ion of monovalent to the total amount of the surface-treating agents is in a specific range, and the porosity Po at the time of the consolidation of the surface-treated calcium carbonate is in a specific range, has a high thixotropic property, exerts a high elongation degree at a low modulus, and imparts such a restoring rate that a load to be applied onto an adherend is reduced, for example, when being mixed in the curable resin composition, and these findings have now led to completion of the present invention.

That is, the present invention pertains to a surface-treated calcium carbonate filler comprising a synthetic calcium carbonate which is surface-treated with a fatty acid-based organic material containing a fatty acid salt and has a floc structure, wherein the ratio Sr of the amount of a fatty acid salt for which a counter ion is of monovalent, and which is contained in surface-treating agents eluted as free materials when the surface-treated calcium carbonate is refluxed with ethanol, to the total amount of the surface-treating agents is 10 to 30 wt %, and the porosity Po at the time of the consolidation of the surface-treated calcium carbonate is 38 to 45%.

The present invention also pertains to the surface-treated calcium carbonate filler, wherein the ratio Cr of the amount of a fatty acid salt for which a counter ion is of divalent or more, and which is contained in surface-treating agents remaining on the calcium carbonate side without being eluted as free materials when the surface-treated calcium carbonate is refluxed with ethanol, to the total amount of the surface-treating agents is 55 to 75 wt %.

The present invention also pertains to a curable resin composition, wherein a curable resin contains the above-mentioned surface-treated calcium carbonate filler.

The present invention also pertains to the curable resin composition, wherein the curable resin is at least one selected from among a silicone resin, a modified silicone resin, an acrylic resin, a modified acrylic resin, and a polyisobutylene resin.

The present invention also pertains to the curable resin composition, wherein the curable resin composition is used for a sealing material or an adhesive.

Effects of the Invention

The surface-treated calcium carbonate having a floc structure of the present invention can provide a curable resin composition which has a high thixotropic property, exerts a high elongation degree at a low modulus, and has such a restoring rate that a load to be applied onto an adherend is reduced by mixing the calcium carbonate in the curable resin composition.

EMBODIMENTS OF THE INVENTION

A surface-treated calcium carbonate filler having a floc structure of the present invention comprises a synthetic calcium carbonate which is surface-treated with a fatty acid-based organic material containing a fatty acid salt, and is characterized in that the ratio Sr of the amount of a fatty acid salt for which a counter ion is of monovalent, and which is contained in surface-treating agents eluted as free materials when the surface-treated calcium carbonate is refluxed with ethanol, to the total amount of the surface-treating agents is 10 to 30 wt %, and the porosity Po at the time of the consolidation of the surface-treated calcium carbonate is 38 to 45%.

In the present invention, the floc structure is characterized by binding the calcium carbonate particles in the form of a three-dimensional network. The porosity Po at the time of the consolidation serves as a measure of a construction degree of the floc structure.

The calcium carbonate includes a natural calcium carbonate (heavy calcium carbonate) and a synthetic calcium carbonate (light or colloidal calcium carbonate). The natural calcium carbonate is produced directly from raw lime stone, and can be produced, for example, by mechanically pulverizing the raw lime stone and classifying the pulverized stones. The synthetic calcium carbonate is produced from calcium hydroxide, and can be produced, for example, by reacting calcium hydroxide with carbon dioxide. Calcium hydroxide can be produced, for example, by reacting calcium oxide with water. Calcium oxide can be produced, for example, by co-combustion of raw lime stone and cokes. In this case, since the carbon dioxide is produced in firing, calcium carbonate can be produced by reacting the carbon dioxide with calcium hydroxide.

As the calcium carbonate in the present invention, a synthetic calcium carbonate is used since the calcium carbonate particle needs to construct a floc structure. A BET specific surface area Sw of the synthetic calcium carbonate is preferably 8 to 30 $m^2/g$. When the BET specific surface area Sw is less than 8 $m^2/g$, there may be cases where it is difficult to impart an adequate thixotropic property. Further, when the BET specific surface area Sw is more than 30 $m^2/g$, the amount of the surface-treating agent required for covering the surface is increased, and there may be cases where high strength cannot be obtained although a high elongation degree at a low modulus can be achieved. More preferred value of the BET specific surface area Sw is 12 to 22 $m^2/g$.

The BET specific surface area Sw is measured by a single point method using a BET specific surface area analyzer (NOVA2000, manufactured by YUASA-IONICS Co., Ltd.).

As the surface-treating agent in the present invention, fatty acid-based organic materials containing a fatty acid salt are used. The fatty acid is not particularly limited, and a saturated fatty acid, an unsaturated fatty acid, derivatives of the saturated fatty acid and the unsaturated fatty acid, and salts thereof are employed. These are used singly or used, as required, in combination of two or more thereof.

The saturated fatty acid is a saturated fatty acid having preferably 6 to 31 carbon atoms, more preferably 8 to 27 carbon atoms, and further preferably 9 to 21 carbon atoms. Specific examples of the saturated fatty acids include caproic acid, caprylic acid, pelargonic acid, capric acid, undecane acid, lauric acid, myristic acid, palmitic acid, stearic acid, arachic acid, behenic acid, lignoceric acid, cerinic acid, heptacosanoic acid, montanic acid, and melissic acid. Among these saturated fatty acids, palmitic acid, stearic acid and lauric acid are preferred.

The unsaturated fatty acid is a fatty acid having a double bond in a molecule, and the unsaturated fatty acid is synthesized within a living body by, for example, a dehydration reaction of the saturated fatty acid. The unsaturated fatty acid is an unsaturated fatty acid having preferably 6 to 31 carbon atoms, more preferably 8 to 26 carbon atoms, and further preferably 9 to 21 carbon atoms. Specific examples of the unsaturated fatty acids include obtusilic acid, caproleic acid, undecylenic acid, linderic acid, tsuzuic acid, physeteric acid, myristoleic acid, palmitoleic acid, petroselinic acid, oleic acid, elaidic acid, asclepinic acid, vaccenic acid, gadoleic acid, gondoic acid, cetoleic acid, erucic acid, brassidic acid, selacholeic acid, ximenic acid, lumequlic acid, sorbic acid, and linoleic acid. Among these, oleic acid, elaidic acid linoleic acid are particularly preferably used.

Further, fatty acids derived from animal materials such as beef tallow and lard, and fatty acids derived from plant materials such as palm and coconut palm, which are formed by mixing the above-mentioned fatty acids, are also preferably used.

Further, examples of salts of these fatty acids include salts of alkali metal such as Na or K which are fatty acid salts having a counter ion of monovalent, and metal salts of Ca, Ba, Mg, Sr or Al (hereinafter, referred to as alkaline-earth metal salts) which are fatty acid salts having a counter ion of divalent or more, and among these, in general, a Na salt and a K salt are used as a metal salt of monovalent, and a Ca salt is used as a metal salt of divalent.

Among these fatty acid salts, the fatty acid salt having a counter ion of monovalent, which is contained in surface-treating agents eluted as free materials when the surface-treated calcium carbonate is refluxed with ethanol, has the action of lowering the modulus because of the flexibility of its molecule itself, but since it is inferior in water resistance to the fatty acid salt having a counter ion of divalent or more, an excessive amount of the fatty acid salt has a fatal adverse effect on water resistance and adhesion properties in warm water. Accordingly, it is necessary that the ratio Sr of the amount of a fatty acid salt of monovalent to the total amount of surface-treating agents is 10 to 30 wt %, preferably 13 to 27 wt %, and more preferably 15 to 25 wt %. When the ratio Sr is less than 10 wt %, the action of lowering the modulus is insufficient.

Further, a fatty acid salt having a counter ion of divalent or more corresponds with the surface-treating agents remaining on the calcium carbonate side without being eluted as free materials when the surface-treated calcium carbonate is refluxed with ethanol, and the fatty acid salt is excellent in water resistance because of the hydrophobicity thereof but may increase the modulus because of the rigidity of a molecule itself, and therefore the ratio Cr of the amount of the fatty acid salt having a counter ion of divalent or more and remaining on the calcium carbonate side to the total amount of the surface-treating agents is preferably 55 to 75 wt %, and more preferably 60 to 70 wt %.

In the present invention, the total amount of surface-treating agents Tg, the ratio Sr of the amount of a fatty acid salt of monovalent to the total amount of surface-treating agents, and the ratio Cr of the amount of a fatty acid salt of divalent or more and remaining on the calcium carbonate side to the total amount of surface-treating agents are measured by the following methods, respectively.

Total Amounts of Surface-Treating Agents Tg:

Using a thermobalance (Model TG-8110 manufactured by Rigaku Corporation), 1 g of surface-treated calcium carbonate particles was put in a 0.5 ml platinum container of 10 mm in diameter, and a temperature of the contents was increased at a temperature raising rate of 15° C./min, and loss on heating from 200° C. to 500° C. is measured and the amount is determined from a rate of loss on heating (mg/g) per 1 g of surface-treated calcium carbonate particles.

Ratio Sr of the amount of a fatty acid salt of monovalent to the total amount of surface-treating agents, and ratio Cr of the amount of a fatty acid salt of divalent or more and remaining on the calcium carbonate side to the total amount of surface-treating agents:

A common extraction method can be used for measurement of the ratio Sr of the amount of a fatty acid salt having a counter ion of monovalent, which is obtained by refluxing the surface-treated calcium carbonate with ethanol, to the total amount of the surface-treating agents; and the ratio Cr of the amount of a fatty acid salt having a counter ion of divalent or more and remaining on the calcium carbonate side without being eluted as free materials when the surface-treated calcium carbonate is refluxed with ethanol, to the total amount of the surface-treating agents. In the present invention, these ratios are measured by the following method.

In the surface-treating agent of the calcium carbonate having a surface treated with a saturated fatty acid, an unsaturated fatty acid, and a monovalent alkali metal salt thereof and divalent or more alkaline-earth metal salt thereof, the alkaline-earth metal salt of the fatty acid is insoluble in a 95% ethanol solvent, but the fatty acid and the alkali metal salt thereof are soluble in a 95% ethanol solvent, and therefore the above-mentioned ratios can be measured by the extraction method using the 95% ethanol solvent. Then, a ratio of the fatty acid and the alkali metal salt thereof can be measured by neutralizing an extracted material (eluted material).

A specific method of measurement will be described below. In addition, in the following description, "amount" is represented on a weight basis.

(1) In a 300 ml conical flask, 5.00 g of a sample of the surface-treated calcium carbonate and 80 g of 95% ethanol were put.

(2) The contents of the flask is refluxed for 1 hour on a water bath maintained at 90° C. or higher to elute the surface-treating agent.

(3) After the contents are adequately cooled at 200° C., the contents were subjected to suction filtration by a Teflon (registered trademark) filter of 0.5 μm or smaller.

(4) A filtrate obtained in (3) is dried and put in a 200 ml beaker having weighed, and evaporated to dry on a water bath maintained at 9° C. or higher to remove the solvent. The amount of remaining materials after removing the solvent are the amount (A) of surface-treating agents eluted as free materials when the surface-treated calcium carbonate is refluxed with ethanol, namely, the total amount of the fatty acid salt having a counter ion of monovalent and the free fatty acid.

(5) A few drops of phenolphthalein is added to isopropyl alcohol, and 25 ml of the resulting solution, which is adjusted to such slight alkali that the solution becomes pink by addition of KOH, and the amount (A) of the surface-treating agent in (4) are put in a beaker, and the dried material in the contents is adequately dissolved on a water bath.

(6) A solution obtained in (5) is titrated with a 0.1 N KOH until the solution becomes slight alkaline to show pink. Number of moles of a fatty acid in the surface-treating agent is determined from the amount (B) (ml) of the above-mentioned titration, and further the amount (C) of a free fatty acid is calculated from a weight-average molecular weight (Mw) of the fatty acid.

Amount of Free Fatty Acid:$(C)=(B)\times 0.1/1000\times$ weight-average molecular weight of fatty acid$\times 1000$ (mg)

Here, the amount (D) of the fatty acid salt having a counter ion of monovalent in the amount (A) of the surface-treating agents can be determined by calculating (A)−(C).

Since all of values of the above-mentioned (A), (D) and (C) are a weight per 5.00 g of the surface-treated calcium carbonate, the amounts per 1.0 g of the surface-treated calcium carbonate are calculated by dividing these values by 5. Moreover, the ratio of the amount (D) of a fatty acid salt having a counter ion of monovalent to the total amount (Tg) of the surface-treating agents, and the ratio of the amount (C) of a free fatty acid to the total amount (Tg) of the surface-treating agents are respectively determined from the total amount (Tg) of surface-treating agents which are separately measured.

Ratio of the amount (D) of a fatty acid salt having a counter ion of monovalent to the total amount (Tg) of the surface-treating agents: $Sr=(D)/5/(Tg)\times 100\%$ Ratio of the amount (C) of a free fatty acid to the total amount (Tg) of the surface-treating agents: $Ar=(C)/5/(Tg)\times 100\%$ Consequently, the ratio (Cr) of the amount of a fatty acid salt being of divalent or more and remaining on the calcium carbonate side without being eluted as free materials to the total amount (Tg) of the surface-treating agents is determined from the following equation.

$Cr=(100-Sr-Ar)\%$

Further, it is also possible to use, within a range of trouble-free as the surface-treating agent of the present invention, alicyclic carboxylic acids typified by naphthenic acid, resin acids typified by abietic acid, pimaric acid, palustric acid and neoabietic acid, and disproportionated rosin thereof, modified rosins typified by hydrogenated rosin, dimer rosin and trimer rosin, sulfonic acids typified by alkylbenzene sulfonate, and alkali metal salts, alkaline-earth metal salts, ammonium salts and amine salts thereof, and anionic, cationic and nonionic surfactants, singly or in combination of two or more thereof.

When the above-mentioned surface-treating agents are conjointly used, it is necessary to exclude the amount of the above-mentioned surface-treating agents from the total amount (Tg) of surface-treating agents for calculation.

Surface treatment (surface coating) of the synthetic calcium carbonate is generally performed by a wet-process, and the wet-process is preferably applied also in the present invention. In this time, salts of fatty acid or salts of fatty acid derivatives, which are used as a surface-treating agent, react with calcium ions in the calcium carbonate slurry to partially produce a precipitation of a reaction product at a location other than the surface of the calcium carbonate or to cause a substitution reaction at the surface of the calcium carbonate, and a part of the fatty acid salt becomes a calcium salt of fatty acid which is a fatty acid salt having a counter ion of divalent, a part of the fatty acid salt remains as a sodium salt of fatty acid which is a fatty acid salt having a counter ion of monovalent, and the rest of the fatty acid salt remains as a fatty acid.

Further, the amount As of the surface-treating agent per a unit specific surface area of the surface-treated calcium carbonate having a floc structure of the present invention is preferably 1.9 to 3.5 mg/m$^2$. When the As is less than 1.9 mg/m$^2$, there may be cases where it is difficult to achieve a high elongation degree at a low modulus. Further, when the As is more than 3.5 mg/m$^2$, since the amount of the surface-treating agent is excessive, there may be cases where high strength cannot be obtained although a high elongation degree at a low modulus can be achieved. The amount of the surface-treating agent per a unit specific surface area is more preferably 2.1 to 2.8 mg/m$^2$.

The amount As [mg/m$^2$] of the surface-treating agent per a unit specific surface area can be determined by (total amount of the surface-treating agents Tg)/(BET specific surface area Sw).

The surface-treated calcium carbonate having a floc structure of the present invention needs to have a porosity Po at the time of the consolidation being 38 to 45%. Herein, the floc structure is characterized by binding the calcium carbonate particles in the form of a three-dimensional network, and is different from conventional structures aimed at being closer to monodispersion, or chain-like or conglomerate agglomerates. Since the floc structure is present, the ratio of voids of the surface-treated calcium carbonate is higher than that of a closest packing structure inherently taken in the case of monodispersion of primary particles. In the present invention, the porosity Po is employed as a measure of a construction degree of the floc structure.

It is known that the porosity in the case of taking the closest packing structure is theoretically 26%, the porosity Po comes closer to 26% when the surface-treated calcium carbonate particles are closer to monodispersion. However, the porosity of 26% is just a theoretical value, and the porosity of the surface-treated calcium carbonate not having a floc structure is around 30%. The present invention is characterized by having a high porosity by having a floc structure, and Po of the surface-treated calcium carbonate needs to be 38 to 45%, and preferably 40 to 45%. When the porosity is less than 38%, desired properties cannot be attained, and the porosity higher than 45% cannot be achieved at this time.

The porosity Po is determined by the following method.

A g (gram) of calcium carbonate is charged into a cylindrical container with a diameter r, and densely compacted for 30 seconds by applying a pressure of 70 kgf/cm$^2$ to prepare pellets of surface-treated calcium carbonate. A consolidation height of the pellet at this time is denoted by H, and a density of the surface-treated calcium carbonate is denoted by ρ. Further, since it is known that a theoretical value of a porosity in the case of taking on an ideal closest packing structure is 26%, the porosity Po of the surface-treated calcium carbonate can be determined from the following equation.

$$Po=\{1-[(A/\rho)/26\%]/(H\times\pi r^2)\}\times100\%$$

In the present invention, a sample amount A of 2.00 g was measured by using a cell (diameter r=1.35 cm) for a constant-pressure ventilation type powder specific surface area measurement apparatus manufactured by SHIMADZU CORPORATION. The density ρ of the surface-treated calcium carbonate varies depending on Tg, however, it can be determined from the following equation based on a true specific gravity 2.7 of calcium carbonate and a specific gravity 0.9 of a common fatty acid.

$$\rho=[(1-Tg/1000)\times2.7]+[(Tg/1000\times0.9)]$$

The means for measuring a porosity or a pore size includes a mercury intrusion-type porosimeter, however, since mercury is intruded by very high pressure in the porosimeter, the floc is destroyed and an advantageous difference is not found numerically. Accordingly, it is simple to use the porosity at the time of the consolidation as a method of evaluating the measure of a construction degree of the floc.

It is possible to provide a curable resin composition which has a high thixotropic property, exerts a high elongation degree at a low modulus, and has such a restoring rate that a load to be applied onto an adherend is reduced by mixing the surface-treated calcium carbonate filler having a floc structure of the present invention as described above in the curable resin.

The reason why this effect is exerted by virtue of the surface-treated calcium carbonate filler having a floc structure of the present invention is presumably considered as follows.

The low modulus can be achieved within a range in which water resistance is not deteriorated by specifying the ratio of the amount of a fatty acid salt having a counter ion of monovalent to the total amount of the surface-treating agents. Also, by having a floc structure, a resin component penetrates into voids of the floc structure and strengthens adhesion between the resin and the surface-treated calcium carbonate. As a result of this, it becomes possible to exert a high elongation degree at a low modulus, and have such a restoring rate that a load to be applied onto an adherend is reduced. Further, since energy is consumed for breaking the floc structure at the time of stress rupture of the cured material, it becomes possible to obtain a cured material of preferred strength.

The surface-treated calcium carbonate filler having a floc structure of the present invention is suitably used for a resin composition particularly in the fields of a sealing material or an adhesive which requires a thixotropic property and a high elongation degree at a low modulus, and it is suitably mixed, for example, in a curable resin which is cured by a water content, a curing agent or the like. Examples of such a curable resin include silicone resins, modified silicone resins, acrylic resins, modified acrylic resins and polyisobutylene resins, and among these resins, silicone-based resins and modified silicone-based resins, which have a silanol group or a reactive silyl group at a terminal and form a siloxane bond by hydrolysis and a condensation reaction, and polyisobutylene-based resins are preferred.

As the silicone-based resins, organic silicon compounds having at least two hydrolyzable groups, which are selected from among an acetoxy group, a ketoxime group, an alkenoxy group, an aminoxy group and an amino group, in a molecule, or partially hydrolyzed products thereof act as a cross-linking agent for the above-mentioned organopolysiloxane, and are essential components for curing the composition of the present invention at room temperature in the presence of a water content. The organic silicon compound preferably has three or more of the hydrolyzable groups in a molecule. Further, when the organic silicon compound has an organic group capable of coupling with a silicon atom other than the hydrolyzable group, a substituted or unsubstituted monovalent hydrocarbon groups similar to R in the organopolysiloxane are preferred, and an alkyl group having 1 to 8 carbon atoms, an alkenyl group and a phenyl group respectively having 2 to 10 carbon atoms are preferred particularly from the viewpoint of ease of synthesis.

Specific examples of such organic silicon compounds include methyltris(methylethylketoxime)silane, vinyltris(m-ethylethylketoxime)silane, methyltriacetoxysilane, ethyltriacetoxysilane, vinyltriacetoxysilane, metyltrimethoxysilane, etyltrimethoxysilane, butyltrimethoxysilane, acetamidesilane, aminoxysiloxane, methyltris(cyclohexylamino)silane, methyltrisisopropenoxysilane, tetraethoxysilane, tetrapropoxysilane, diacetoxymethylsilane, diacetoxydimethylsilane, diacetoxy-(methyl)-vinylsilane, methyltriacetoxysilane, triacetoxyvinylsilane, tetraacetoxysilane, ethyltriacetoxysilane, diacetoxymethylphenylsilane, methyltri(butanoxime)silane, vinyltri(butanoxime)silane, phenyltri(butanoxime)silane, propyltri(butanoxime)silane, methyltri(isopropenoxy)silane, tri(isopropenoxy)silane, tetrapropenoxysilane, phenyltrialkenoxysilane, isopropylpropenoxysilane, butyltripropenoxysilane, and vinyltripropenoxysilane. In addition, these organic silicon compounds may be used singly or may be used as a mixture of two or more thereof, but it is preferred to use organic silicon compounds having the same hydrolyzable group singly or in combination of two or more of the organic silicon compounds for stable production.

The amount of the organic silicon compounds or the partially hydrolyzed products thereof, respectively serving as a cross-linking agent, to be compounded is preferably 1 to 30 parts by weight with respect to 100 parts by weight of organopolysiloxane, and particularly preferably 3 to 10 parts by weight. When the amount of the organic silicon compounds or the partially hydrolyzed products thereof to be compounded is less than 1 part by weight, curing of the composition is insufficient and there may be cases where storage stability is deteriorated, and on the other hand, when the amount is more than 30 parts by weight, the resulting cured material is hard and brittle, and product performance and cost performance as a seal material may be impaired.

Modified silicone-based resins refer to liquid polymers which have polyoxyalkylene as a main chain backbone and have a silyl group containing a hydrolyzable group (e.g., a hydrogen atom, a halogen atom, an alkoxy group, an acyloxy group, a ketoxymate group, an amino group, an amide group, an acid amide group, an aminoxy group, a mercapto group, an alkenyloxy group, etc.) at a terminal or in a side chain. Examples of the polyoxyalkylene include polyoxyethylene, polyoxypropylene and polyoxybutylene, and polyoxypropylene is preferably used. The present invention is not limited to these, and any modified silicone resin may be used regardless of a main backbone structure as long as it has a crosslinkable silyl group in a molecule. The modified silicone-based resin itself is publicly known, and for example, it includes MS Polymer series ("MS Polymer S-203", etc.) manufactured by KANEKA CORPORATION and "Excestar" (registered trademark) manufactured by ASAHI GLASS CO., LTD.

As a polyisobutylene-based resin, a resin, which is predominantly composed of a silyl group-terminated polyether formed by introducing a reactive silyl group into the terminal, reacts with water to form a siloxane bond to be cured, and is commonly-marketed, can be used. As the commercially available product, for example, EP-505S, EP-303S manufactured by KANEKA CORPORATION and the like are exemplified. These resins are used singly or used, as required, in combination of two or more of the resins. Moreover, the polyisobutylene-based resin can be used in combination with the silicone-based resin as required.

In general, in the curable resin composition of the present invention, a plasticizer, a filler, and a curing agent and the like are mixed and further various additives are mixed as required.

Examples of the plasticizer include dimethyl phthalate (DMP), diethyl phthalate (DEP), di-n-butyl phthalate (DBP), diheptyl phthalate (DHP), dioctyl phthalate (DOP), diisononyl phthalate (DINP), diisodecyl phthalate (DIDP), ditridecyl phthalate (DTDP), butylbenzyl phthalate (BBP), dicyclohexyl phthalate (DCHP), tetrahydrophthalic ester, dioctyl adipate (DOA), diisononyl adipate (DINA), diisodecyl adipate (DIDA), di-n-alkyl adipate, dibutyl diglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl) phosphate (TOP), tri(chloroethyl) phosphate (TCEP), tris(dichloropropyl) phosphate (CRP), tributoxyethyl phosphate (TBXP), tris(d-chloropropyl) phosphate (TMCPP), triphenyl phosphate (TPP), octyl diphenyl phosphate (CDP), acetyl triethyl citrate and acetyl tributyl citrate, and in addition, include trimellitic acid-based plasticizers, polyester-based plasticizers, chlorinated paraffins, stearic acid-based plasticizers, and further dimethyl polysiloxane.

The filler includes inorganic fillers and organic fillers. Examples of materials of the inorganic fillers include calcium carbonates (natural products, synthesized products), calcium-magnesium carbonates (natural products, synthesized products), basic magnesium carbonates, quartz powder, silica powder, fine powdered silicate (dry products, wet products, products by a gel method), fine powdered calcium silicate, fine powdered aluminum silicate, kaolin clay, pyrophyllite clay, talc, sericite, mica, bentonite, nepheline syenite, aluminum hydroxide, magnesium hydroxide, barium sulfate, carbon blacks (furnace black, thermal black, acetylene black), graphite, and, as acicular or fibrous materials, sepiolite, wollastonite, xonotlite, potassium titanate, carbon fibers, mineral fibers, glass fibers, and, as balloon-like or beads-like materials, shirasu balloons, fly-ash balloons, glass balloons, silica beads, alumina beads and glass beads. Examples of materials of the organic fillers include wood powder, walnut powder, cork powder, flour, starch, ebonite powder, rubber powder, lignin, phenolic resins, high-styrene resins, polyethylene resins, silicone resins, urea resins, and cellulose powder, pulp powder and synthetic fiber powder as fibrous materials.

Examples of other additives include a curing catalyst, solvents for adjusting viscosity and other properties, and waxes such as amide wax and castor oil wax.

As the curing catalyst, tin-based compounds or amine compounds are generally used. Specific examples of the organic tin compounds include dibutyltin laurate, dibutyltin dilaurate, dibutyltin dioctoate, dibutyltin acetate, dioctyltin stearate, dioctyltin laurate, dioctyltin diversatate, dibutyltin bistriethoxysilicate, dibutyltin bisisononyl-3-mercaptopropionate, dibutyltin bisacetylacetonate, dibutyltin bis(o-phenylphenoxide), dibutyltin bis(isooctyl thioglycolate), dibutyltin oxide, and dioctyltin oxide, and these organic tin compounds are used singly or used in combination of two or more thereof.

As the amine compound, an amino group-containing silane compound is preferred, and examples thereof include 3-aminopropyltrimethoxysilane, 3-aminopropylmethyldimethoxysilane, 3-aminopropyltriethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N,N'-bis[3-(trimethoxysilyl)propyl]ethylene diamine, N,N'-bis[3-(triethoxysilyl)propyl]ethylenediamine, N,N'-bis[3-(methyldimethoxysilyl)propyl]ethylenediamine, N,N'-bis[3-(trimethoxysilyl)propyl]hexamethylenediamine, N,N'-bis[3-(triethoxysilyl)propyl]hexamethylenediamine, N,N'-bis[3-(methyldimethoxysilyl)propyl]hexamethylenediamine, N,N-bis[3-(trimethoxysilyl)propyl]ethylenediamine, N,N-bis[3-(methyldimethoxysilyl)propyl]ethylenediamine, N,N-bis[3-(triethoxysilyl)propyl]ethylenediamine, N,N-bis[3-(trimethoxysilyl)propyl]hexamethylenediamine, N,N-bis[3-(methyldimethoxysilyl)propyl]hexamethylenediamine, N,N-bis[3-(triethoxysilyl)propyl]hexamethylenediamine, N,N-bis[3-(trimethoxysilyl)propyl]amine, N,N-bis[3-(triethoxysilyl)propyl]amine, and N,N-bis[3-(methyldimethoxysilyl)propyl]amine, and these amine compounds are used singly or used in combination of two or more thereof.

Examples of the solvent include aromatic hydrocarbons such as toluene and xylene, aliphatic hydrocarbons such as hexane and butane, petroleum base solvents such as gasoline, ketones such as acetone and methyl ethyl ketone, and ether esters such as cellosolve acetate. In addition to the solvent, additives such as a silicone oil and a fatty acid ester-modified silicone oil, a variety of other additives to be used as required, and coloring agents may be added singly or in combination of two or more thereof. When the surface-treated calcium carbonate filler of the present invention is used for the silicone-based resin composition or the polyisobutylene-based resin composition, the surface-treated calcium carbonate filler may be used in combination with a filler previously used within an acceptable range of performance.

The amount of the surface-treated calcium carbonate filler of the present invention to be compounded in the resin varies with the type and use of a resin and is thus hardly specified generally, however, the amount is properly 5 to 200 parts by weight, and preferably about 20 to 150 parts by weight with respect to 100 parts by weight of a resin. When the amount of the surface-treated calcium carbonate filler is less than 5 parts by weight, the filler cannot impart sufficient adhesion properties in warm water to the resin, and when the amount is more than 200 parts by weight, viscosity of the resin becomes too high to deteriorate workability. The amount of the plasticizer to be compounded is appropriately selected and is not particularly limited, and the amount of 10 to 80 parts by weight with respect to 100 parts by weight of a resin is usually employed. The amount of the filler to be compounded is appropriately selected and is not particularly limited, and the amount of 10 to 80 parts by weight with respect to 100 parts by weight of a resin is usually employed.

EXAMPLES

Hereinafter, the present invention will be described in more detail by way of Examples and Comparative Examples, but the present invention is not limited to these at all.

Example 1

Into 10 kg of a calcium hydroxide slurry which was adjusted to have a solid content concentration of 10 wt % and a temperature of 14° C., carbon dioxide in the concentration of 30% was introduced in an amount of 500 L/hr per 1 kg of the calcium hydroxide slurry to synthesize calcium carbonate. The synthesized calcium carbonate was stirred and aged to grow and disperse primary particles, and further the resulting calcium carbonate slurry was circulated at a discharge rate of 20 kg/hr and thereby a calcium carbonate having a floc structure was produced. To 10 kg of the calcium carbonate slurry, 51 g of a palm soap (PALMOSALT 9225 manufactured by PALM-OLEO (KLANG) Sdn. Bhd.), which was dissolved in hot water so as to be 10 wt % in concentration, was added, and the resulting mixture was stirred for 1 hour to perform surface treatment. Thereafter, the calcium carbonate slurry was dehydrated to a level of a solid content of 60 wt %, dried and pulverized to obtain a surface-treated calcium carbonate filler having a floc structure.

Details of the obtained surface-treated calcium carbonate filler having a floc structure are shown in Tables 1 and 2.

Example 2

A surface-treated calcium carbonate filler having a floc structure was obtained in the same manner as in Example 1 except for using a tallowate soap prepared by using 60 g of tallowate (mixed fatty acid manufactured by NOF Corporation) and appropriately adding NaOH such that a saponification ratio of the tallowate was 100%.

Details of the obtained surface-treated calcium carbonate filler having a floc structure are shown in Tables 1 and 2.

Example 3

A surface-treated calcium carbonate filler having a floc structure was obtained in the same manner as in Example 1 except for using a fatty acid soap prepared by appropriately adding NaOH to 12.0 g of lauric acid (C12-98/100 MY manufactured by Oleochemicals Gmbh), 18.0 g of myristic acid (C14-98/100 MY manufactured by Oleochemicals Gmbh), 12.0 g of stearic acid (C18-98/100 MY manufactured by Oleochemicals Gmbh) and 18.0 g of oleic acid (Edenor OL72 MY manufactured by Oleochemicals Gmbh) such that a saponification ratio of these acids was 100%.

Details of the obtained surface-treated calcium carbonate filler having a floc structure are shown in Tables 1 and 2.

Example 4

A surface-treated calcium carbonate filler having a floc structure was obtained in the same manner as in Example 1 except for using a fatty acid soap prepared by appropriately adding NaOH to 9.0 g of palmitic acid (C16-981100 MY manufactured by Oleochemicals Gmbh), 9.0 g of stearic acid (C18-98/100 MY manufactured by Oleochemicals Gmbh) and 42.0 g of oleic acid (Edenor OL72 MY manufactured by Oleochemicals Gmbh) such that a saponification ratio of these acids was 100%.

Details of the obtained surface-treated calcium carbonate filler having a floc structure are shown in Tables 1 and 2.

Example 5

A surface-treated calcium carbonate filler having a floc structure was obtained in the same manner as in Example 1 except for using a partially saponified tallowate soap prepared by using 60 g of tallowate (mixed fatty acid manufactured by NOF Corporation) and appropriately adding NaOH such that a saponification ratio of the tallowate was 75%.

Details of the obtained surface-treated calcium carbonate filler having a floc structure are shown in Tables 1 and 2.

Example 6

A surface-treated calcium carbonate filler having a floc structure was obtained in the same manner as in Example 1 except for using an excessively saponified tallowate soap prepared by using 60 g of tallowate (mixed fatty acid manufactured by NOF Corporation) and appropriately adding NaOH such that a saponification ratio of the tallowate was 150%.

Details of the obtained surface-treated calcium carbonate filler having a floc structure are shown in Tables 1 and 2.

Example 7

Into 10 kg of the calcium hydroxide slurry which was adjusted to have a solid content concentration of 12.0 wt % and a temperature of 14° C., carbon dioxide in the concentration of 30% was introduced in an amount of 500 L/hr per 1 kg of the calcium hydroxide slurry to synthesize calcium carbonate. The synthesized calcium carbonate was stirred and aged for 36 hours to grow and disperse primary particles, and further the resulting calcium carbonate slurry was circulated at a discharge rate of 30 kg/hr and thereby a calcium carbonate having a floc structure was produced. To 10 kg of the calcium carbonate slurry, 42 g of a tallowate (mixed fatty acid manufactured by NOF Corporation) which was dissolved in hot water so as to be 10 wt % in concentration, and a fatty acid soap which was prepared by appropriately adding NaOH such that a saponification ratio of the fatty acid was 100% were added, and the resulting mixture was stirred for 1 hour to perform surface treatment. Thereafter, the calcium carbonate slurry was dehydrated to a level of a solid content of 60 wt %, dried and pulverized to obtain a surface-treated calcium carbonate filler having a floc structure.

Details of the obtained surface-treated calcium carbonate filler having a floc structure are shown in Tables 1 and 2.

Example 8

Into 10 kg of the calcium hydroxide slurry which was adjusted to have a solid content concentration of 9.0 wt % and a temperature of 14° C., carbon dioxide in the concentration of 30% was introduced in an amount of 500 L/hr per 1 kg of the calcium hydroxide slurry to synthesize calcium carbonate. The synthesized calcium carbonate was stirred and aged for 6 hours to grow and disperse primary particles, and further the resulting calcium carbonate slurry was circulated at a discharge rate of 5 kg/hr and thereby a calcium carbonate having a floc structure was produced. To 10 kg of the calcium carbonate slurry, 80 g of a palm soap (PALMOSALT 9225 manufactured by PALM-OLEO (KLANG) Sdn. Bhd.), which was dissolved in hot water so as to be 10 wt % in concentration, was added, and the resulting mixture was stirred for 1 hour to perform surface treatment. Thereafter, the calcium carbonate slurry was dehydrated to a level of a solid content of 60 wt %, dried and pulverized to obtain a surface-treated calcium carbonate filler having a floc structure.

Details of the obtained surface-treated calcium carbonate filler having a floc structure are shown in Tables 1 and 2.

Comparative Example 1

A surface-treated calcium carbonate filler having a floc structure was obtained in the same manner as in Example 1 except for using a partially saponified tallowate soap prepared by using 60 g of tallowate (mixed fatty acid manufactured by NOF Corporation) and appropriately adding NaOH such that a saponification ratio of the tallowate was 50%.

Details of the obtained surface-treated calcium carbonate filler having a floc structure are shown in Tables 1 and 2.

Comparative Example 2

A surface-treated calcium carbonate filler having a floc structure was obtained in the same manner as in Example 7 except for using an excessively saponified tallowate soap prepared by using 56 g of tallowate (mixed fatty acid manufactured by NOF Corporation) and appropriately adding NaOH such that a saponification ratio of the tallowate was 300%.

Details of the obtained surface-treated calcium carbonate filler having a floc structure are shown in Tables 1 and 2.

Comparative Example 3

Into 10 kg of the calcium hydroxide slurry which was adjusted to have a solid content concentration of 9.0 wt % and a temperature of 14° C., carbon dioxide in the concentration of 30% was introduced in an amount of 500 L/hr per 1 kg of the calcium hydroxide slurry to synthesize calcium carbonate. A calcium carbonate, in which the synthesized calcium carbonate was stirred and aged at 60° C. for 12 hours to grow and disperse primary particles, was produced. To 10 kg of the calcium carbonate slurry, 46 g of a palm soap (PALMOSALT 9225 manufactured by PALM-OLEO (KLANG) Sdn. Bhd.), which was dissolved in hot water so as to be 10 wt % in concentration, was added, and the resulting mixture was stirred for 1 hour to perform surface treatment. Thereafter, the calcium carbonate slurry was dehydrated to a level of a solid content of 60 wt %, dried and pulverized to obtain a surface-treated calcium carbonate filler having a floe structure.

Details of the obtained surface-treated calcium carbonate filler having a floc structure are shown in Tables 1 and 2.

TABLE 1

| | Measured values | | | | Per 5.0 g of surface-treated calcium carbonate | | | |
|---|---|---|---|---|---|---|---|---|
| | Average molecular weight of fatty acids Mw | Specific gravity ρ | Consolidation height H mm | Total amount of surface-treating agent Tg mg/g | 95% EtOH elution amount (A) mg | 0.1N KOH titration amount (B) ml | Amount of free fatty acid (C) mg | Amount of monovalent fatty acid salt (D) mg |
| Example 1 | 256 | 2.64 | 7.07 | 35 | 57.8 | 1.1 | 28.2 | 29.6 |
| Example 2 | 274 | 2.64 | 7.28 | 42 | 71.3 | 1.08 | 29.6 | 41.7 |
| Example 3 | 249 | 2.64 | 7.32 | 42 | 58.9 | 1.02 | 25.4 | 33.5 |
| Example 4 | 276 | 2.64 | 7.2 | 42 | 79.8 | 1.44 | 39.7 | 40.1 |
| Example 5 | 274 | 2.64 | 7.3 | 42 | 54.6 | 0.92 | 25.2 | 29.4 |
| Example 6 | 274 | 2.64 | 6.94 | 42 | 86.2 | 0.9 | 24.7 | 61.5 |
| Example 7 | 274 | 2.64 | 7.18 | 27 | 47.2 | 0.88 | 24.1 | 23.1 |
| Example 8 | 256 | 2.6 | 7.02 | 56 | 78.4 | 1.3 | 33.3 | 45.1 |

TABLE 1-continued

| | Measured values | | | | Per 5.0 g of surface-treated calcium carbonate | | | |
|---|---|---|---|---|---|---|---|---|
| | Average molecular weight of fatty acids Mw | Specific gravity ρ | Consolidation height H mm | Total amount of surface-treating agent Tg mg/g | 95% EtOH elution amount (A) mg | 0.1N KOH titration amount (B) ml | Amount of free fatty acid (C) mg | Amount of monovalent fatty acid salt (D) mg |
| Comp. Example 1 | 274 | 2.62 | 7.33 | 42 | 37.8 | 0.77 | 21.1 | 16.7 |
| Comp. Example 2 | 274 | 2.64 | 6.62 | 33 | 90.7 | 0.3 | 8.2 | 82.5 |
| Comp. Example 3 | 256 | 2.64 | 6.7 | 34 | 34 | 0.6 | 15.4 | 18.6 |

TABLE 2

| | Surface-treated calcium carbonate filler | | | | |
|---|---|---|---|---|---|
| | Monovalent fatty acid salt Sr % | Consolidation porosity Po % | Divalent fatty acid salt Cr % | BET specific surface area Sw m$^2$/g | Amount of surface-treating agnet As mg/m$^2$ |
| Example 1 | 17 | 41 | 67 | 17.9 | 1.96 |
| Example 2 | 20 | 42.4 | 66 | 17.6 | 2.39 |
| Example 3 | 16 | 42.7 | 72 | 17.4 | 2.41 |
| Example 4 | 22 | 41.8 | 62 | 17.4 | 2.41 |
| Example 5 | 14 | 42.6 | 74 | 17.4 | 2.41 |
| Example 6 | 29 | 39.6 | 56 | 17.4 | 2.41 |
| Example 7 | 17 | 42.2 | 65 | 11.3 | 2.39 |
| Example 8 | 16 | 39.7 | 72 | 23.5 | 2.38 |
| Comp. Example 1 | 8 | 42.8 | 82 | 17.6 | 2.39 |
| Comp. Example 2 | 50 | 37 | 45 | 11.3 | 2.92 |
| Comp. Example 3 | 11 | 37.8 | 80 | 15 | 2.27 |

Examples 9 to 16, Comparative Example 4 to 6

By using the surface-treated calcium carbonate fillers obtained in Examples 1 to 8 and Comparative Example 1 to 3, one-component type modified silicone-based sealants were prepared according to the following test method (1), and their properties were evaluated by the following methods. The results of viscosity of the sealants before curing are shown in Table 3, and the results of properties after curing are shown in Table 4.

(Test Method (1) One-Component Type Modified Silicone-Based Sealants)
[Formulation]

| | |
|---|---|
| Modified silicone resin (MS polymer S203 manufactured by KANEKA CORPORATION) | 300 parts by weight |
| Plasticizer DINP (manufactured by J-PLUS Co., Ltd.) | 180 parts by weight |
| Heavy calcium carbonate (Super S manufactured by MARUO CALCIUM CO., LTD.) | 90 parts by weight |
| Surface-treated calcium carbonate filler | 420 parts by weight |
| Dehydrating agent KBM-1003 (manufactured by Shin-Etsu Chemical Co., Ltd.) | 18 parts by weight |
| Tin catalyst NEOSTANN U-220H (manufactured by Nitto Kasei Co., Ltd.) | 6 parts by weight |
| Aminosilane KBM-603 (manufactured by Shin-Etsu Chemical. Co., Ltd.) | 6 parts by weight |
| Total | 1020 parts by weight |

[Kneading Method]

Into a 5 L Universal Mixer/Kneader (manufactured by DALTON CORPORATION), a modified silicone resin and a plasticizer were charged, and a surface-treated calcium carbonate filler and heavy calcium carbonate, which were previously dried at 105° C. for 2 hours or more, were charged together, and the resulting mixture was preliminarily stirred at a low speed for 15 minutes. Thereafter, the filler adhering to the interior of the mixer/kneader was scraped down, and immediately the mixture was kneaded at a high speed for 30 minutes in a vacuum atmosphere. Thereafter, a dehydrating agent, a tin catalyst and aminosilane were charged into the mixer and the resulting mixture was mixed at a low speed for 15 minutes in a vacuum atmosphere. The resulting mixture was filled into a cartridge coated with an aluminum foil laminate and the cartridge was plugged with a metal plunger to prepare a one-component modified silicone sealant.

[Method of Viscosity Measurement]

The sealant which was left standing at 23° C. for one day was filled into a 100 ml PP cup by a cartridge gun, and viscosity was measured by using (rotor No. 7) BS type viscometer (VISCOMETER TV-20, manufactured by Tokimec, Inc.)

A value after a lapse of 3 minutes was employed as viscosity at 1 rpm, and a value after a lapse of 1 minute was employed as viscosity at 10 rpm. Further, a TI (thixotropic index) value is represented by a value of the viscosity at 1 rpm divided by the viscosity at 10 rpm.

[Criteria of Viscosity Rating]

The TI value (viscosity at 1 rpm/viscosity at 10 rpm) was rated according to the following criteria.

⊙: 7.0 or more
◯: 6.5 or more and less than 7.0
Δ: 6.0 or more and less than 6.5
×: less than 6.0

[Method of Tensile Test]

A primer (No. 40 manufactured by Yokohama Rubber Co., Ltd.) was applied onto the surface of an aluminum plate (50 mm×50 mm×3 mm) and dried for 60 minutes, and the above-mentioned sealant was filled (configuration: 12 mm×12 mm×50 mm), and a H-shaped specimen was prepared according to JIS A 1439; Testing methods of sealants for sealing and glazing in buildings 5.17.2 Durability, Preparation of Tensile Test Specimen.

This specimen was aged at 23° C. for 14 days and then at 35° C. for 14 days, and measurement was performed after a lapse of one day at 23° C. by using a tensile tester (Autograph AG-1 manufactured by SHIMADZU CORPORATION).

50% modulus: A value obtained by dividing a load at the time when a specimen is pulled at a speed of 50 mm/min and elongated by an elongation degree of 50% (6 mm) by a cross-section area (600 mm$^2$) of a sealant.

Maximum strength: A value obtained by dividing the largest load at the time when a specimen is pulled at a speed of 50 mm/min by a cross-section area of a sealant.

Elongation degree: A value obtained by dividing the amount of displacement in measuring the maximum strength by the configuration (12 mm) at the time of filling and multiplying this by 100.

Adhesion properties (initial): Adhesion properties were rated by the proportion of the sealant remaining on the aluminum adherend broken when specimen was aged at 23° C. for 14 days and then at 35° C. for 14 days, and a tensile test was performed after a lapse of one day at 23° C.

Adhesion properties (in warm water) After initial aging, a specimen was immersed in warm water of 50° C. for 7 days, and then a tensile test was performed, and adhesion properties were rated by the proportion of the sealant remaining on the broken aluminum adherend.

[Rating Criteria of Tensile Test]

50% modulus:
⊚: less than 0.15 N/mm$^2$
◯: 0.15 N/mm$^2$ or more and less than 0.18 N/mm$^2$
Δ: 0.18 N/mm$^2$ or more and less than 0.20 N/mm$^2$
x: 0.20 N/mm$^2$ or more Maximum Strength:
◯: 0.3 N/mm$^2$ or more and less than 0.6 N/mm$^2$
Δ: 0.6 N/mm$^2$ or more
x: less than 0.3 N/mm$^2$ Elongation Degree:
⊚: 700% or more
◯: 600% or more and less than 700%
Δ: 500% or more and less than 600%
x: less than 500%

Adhesion properties: A state, in which a sealant remains on an aluminum adherend, is represented by cohesion failure CF and rated by the following criteria.
◯: Failure in a state in which 100% of a sealant remains (CF 100%)
Δ: Failure in a state in which a remaining sealant is 50% or more and less than 100% (CF 50%-CF 99%)
x: State in which a remaining sealant is less than 50% (CF<50%), or state in which a sealant is peeled off (AF)

[Restorability of Elasticity]

A primer (No. 40 manufactured by Yokohama Rubber Co., Ltd.) was applied onto the surface of an aluminum plate (75 mm×12 mm×6 mm) and dried for 60 minutes, and the above-mentioned sealant was filled (configuration: 12 mm×12 mm×50 mm), and a specimen for restorability of elasticity was prepared according to JIS A 1439; Sealing materials in buildings 5.3.2 Preparation of Specimen for Tensile Characteristics. This specimen was aged at 23° C. for 28 days, at 70° C. for 3 days, at 23° C. for 1 day in water, at 70° C. for 2 days, and at 23° C. for 1 day in water, and then elongation of 24 mm was carried out for 1 hour. A width of the specimen was measured after releasing the load at the elongation, and a value, which is obtained by dividing the width by the configuration (12 mm) at the time of filling and multiplying this by 100, was employed.

[Rating Criteria of Restorability of Elasticity]
⊙: 60% or more and less than 65%
◯: 65% or more and less than 70%
Δ: 70% or more and less than 80%
x: less than 60%, or 80% or more

TABLE 3

| | | Viscosity of sealant | | | |
| --- | --- | --- | --- | --- | --- |
| | | 1 rpm (Pa·s) | 10 rpm (Pa·s) | TI value (1r./10r.) | Rating |
| Example 9 | Example 1 | 1,690 | 250 | 6.76 | ◯ |
| Example 10 | Example 2 | 2,410 | 339 | 7.11 | ⊚ |
| Example 11 | Example 3 | 1,890 | 290 | 6.52 | ◯ |
| Example 12 | Example 4 | 1,720 | 267 | 6.44 | Δ |
| Example 13 | Example 5 | 1,940 | 302 | 6.42 | Δ |
| Example 14 | Example 6 | 2,650 | 366 | 7.24 | ⊚ |
| Example 15 | Example 7 | 2,020 | 322 | 6.27 | Δ |
| Example 16 | Example 8 | 3,450 | 490 | 7.04 | ⊚ |
| Comp. Example 4 | Comp. Example 1 | 2,430 | 336 | 7.23 | ⊚ |
| Comp. Example 5 | Comp. Example 2 | 1,980 | 301 | 6.58 | ◯ |
| Comp. Example 6 | Comp. Example 3 | 2,240 | 325 | 6.89 | ◯ |

TABLE 4

| | | | Properties of sealant | | | | | | | | Restorability of elasticity | |
| --- | --- | --- | --- | --- | --- | --- | --- | --- | --- | --- | --- | --- |
| | | | 50% modulus | | Maximum strength | | Elongation degree | | Adhesion property | | | |
| | | Condition | (N/mm$^2$) | Rating | (N/mm$^2$) | Rating | (%) | Rating | (CF %) | Rating | (%) | Rating |
| Example 9 | Example 1 | Initial | 0.14 | ⊚ | 0.55 | ◯ | 680 | ◯ | 100 | ◯ | 68 | ◯ |
| | | Warm water | 0.09 | ⊚ | 0.37 | ◯ | 710 | ⊚ | 100 | ◯ | | |
| Example 10 | Example 2 | Initial | 0.13 | ⊚ | 0.54 | ◯ | 720 | ⊚ | 100 | ◯ | 63 | ⊚ |
| | | Warm water | 0.06 | ⊚ | 0.33 | ◯ | 860 | ⊚ | 100 | ◯ | | |
| Example 11 | Example 3 | Initial | 0.16 | ◯ | 0.87 | Δ | 680 | ◯ | 100 | ◯ | 66 | ◯ |
| | | Warm water | 0.11 | ⊚ | 0.42 | ◯ | 710 | ⊚ | 100 | ◯ | | |
| Example 12 | Example 4 | Initial | 0.1 | ⊚ | 0.46 | ◯ | 780 | ⊚ | 100 | ◯ | 63 | ⊚ |
| | | Warm water | 0.06 | ⊚ | 0.34 | ◯ | 570 | Δ | 70 | Δ | | |
| Example 13 | Example 5 | Initial | 0.17 | ◯ | 0.82 | Δ | 690 | ◯ | 100 | ◯ | 77 | Δ |
| | | Warm water | 0.09 | ⊚ | 0.55 | ◯ | 660 | ◯ | 100 | ◯ | | |
| Example 14 | Example 6 | Initial | 0.08 | ⊚ | 0.45 | ◯ | 830 | ⊚ | 100 | ◯ | 62 | ⊚ |
| | | Warm water | 0.05 | ⊚ | 0.31 | ◯ | 530 | Δ | 55 | Δ | | |

TABLE 4-continued

| | | | Properties of sealant | | | | | | | | Restrability of elasticity | |
|---|---|---|---|---|---|---|---|---|---|---|---|---|
| | | | 50% modulus | | Maximum strength | | Elongation degree | | Adhesion property | | | |
| | | Condition | (N/mm²) | Rating | (N/mm²) | Rating | (%) | Rating | (CF %) | Rating | (%) | Rating |
| Example 15 | Example 7 | Initial | 0.12 | ◉ | 0.72 | Δ | 660 | ○ | 100 | ○ | 64 | ◉ |
| | | Warm water | 0.08 | ◉ | 0.45 | ○ | 580 | Δ | 100 | ○ | | |
| Example 16 | Example 8 | Initial | 0.12 | ◉ | 0.55 | ○ | 630 | ○ | 100 | ○ | 73 | Δ |
| | | Warm water | 0.08 | ◉ | 0.33 | ○ | 550 | Δ | 100 | ○ | | |
| Comp. Example 4 | Comp. Example 1 | Initial | 0.19 | Δ | 1.23 | Δ | 595 | Δ | 100 | ○ | 82 | X |
| | | Warm water | 0.16 | ○ | 0.87 | Δ | 623 | ○ | 100 | ○ | | |
| Comp. Example 5 | Comp. Example 2 | Initial | 0.06 | ◉ | 0.33 | ○ | 830 | ◉ | 100 | ○ | 58 | X |
| | | Warm water | 0.04 | ◉ | 0.15 | X | 430 | X | 20 | X | | |
| Comp. Example 6 | Comp. Example 3 | Initial | 0.18 | Δ | 0.88 | Δ | 650 | ○ | 100 | ○ | 85 | X |
| | | Warm water | 0.13 | ◉ | 0.33 | ○ | 480 | X | 100 | ○ | | |

As is apparent from Tables 3 and 4, it is found that modified silicone-based sealants of Examples 9 to 16 prepared by compounding the surface-treated calcium carbonate fillers of Examples 1 to 8 have an excellent thixotropic property, a high elongation, degree at a low modulus and good water-resistant adhesion, and exhibits performance of having moderate restorability of elasticity by which a load is hardly applied to an adherend.

INDUSTRIAL APPLICABILITY

The surface-treated calcium carbonate having a floc structure of the present invention can provide a curable resin composition which has a high thixotropic property, exerts a high elongation degree at a low modulus, and has such a restoring rate that a load to be applied onto an adherend is reduced particularly by mixing the calcium carbonate in the curable resin composition.

The invention claimed is:

1. A surface-treated calcium carbonate filler comprising a synthetic calcium carbonate which is surface-treated with a fatty acid-based organic material containing a fatty acid salt and has a floc structure, wherein
    an amount of a fatty acid salt for which a counter ion is monovalent, and which is contained in surface-treating agents, relative to the total amount of the surface-treating agents, is 10 to less than 27 wt %, and
    a porosity of the surface-treated calcium carbonate filler is 38 to 45%.

2. The surface-treated calcium carbonate filler according to claim 1,
    wherein an amount of a fatty acid salt for which a counter ion is divalent or more, and which is contained in surface-treating agents remaining on the calcium carbonate without being eluted as free materials when the surface-treated calcium carbonate is refluxed with ethanol, relative to the total amount of the surface-treating agents is 55 to 75 wt %.

3. A curable resin composition containing the surface-treated calcium carbonate filler defined in claim 1.

4. A curable resin composition containing the surface-treated calcium carbonate filler defined in claim 2.

5. The curable resin composition according to claim 3, wherein the curable resin is at least one selected from the group consisting of a silicone resin, a modified silicone resin, an acrylic resin, a modified acrylic resin and a polyisobutylene resin.

6. A sealing material or an adhesive comprising the curable resin composition according to claim 3.

7. A sealing material or an adhesive comprising the curable resin composition according to claim 4.

8. The curable resin composition according to claim 4, wherein the curable resin is at least one selected from the group consisting of a silicone resin, a modified silicone resin, an acrylic resin, a modified acrylic resin and a polyisobutylene resin.

* * * * *